United States Patent
Terashima (10) Patent No.: US 9,899,847 B2
(45) Date of Patent: Feb. 20, 2018

(54) BATTERY SYSTEM CONFIGURED TO SET AND REDUCE AN UPPER LIMIT POWER VALUE THAT IS DISCHARGED FROM AN ALKALI SECONDARY BATTERY

(71) Applicant: TOYOTA JIDOSHA KABUSHIKI KAISHA, Toyota-shi, Aichi-ken (JP)

(72) Inventor: Daiki Terashima, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 210 days.

(21) Appl. No.: 14/936,094

(22) Filed: Nov. 9, 2015

(65) Prior Publication Data
US 2016/0134139 A1 May 12, 2016

(30) Foreign Application Priority Data
Nov. 11, 2014 (JP) ................................ 2014-229224

(51) Int. Cl.
H01M 10/46 (2006.01)
H02J 7/00 (2006.01)

(52) U.S. Cl.
CPC ................................ *H02J 7/0031* (2013.01)

(58) Field of Classification Search
CPC .............................. H02J 7/0021; H02J 7/0026
USPC ........ 320/132, 149, 150; 324/426, 430, 433; 702/63, 64, 65
See application file for complete search history.

(56) References Cited

U.S. PATENT DOCUMENTS

| 8,615,372 B2 * | 12/2013 | Tomura | G01R 31/3651 702/63 |
| 2015/0022157 A1 * | 1/2015 | Takahashi | H01M 10/482 320/134 |
| 2015/0100260 A1 * | 4/2015 | Joe | G01R 31/3606 702/63 |

FOREIGN PATENT DOCUMENTS

| JP | 2013-171691 A | 9/2013 |
| WO | 2013/105140 A | 7/2013 |

* cited by examiner

*Primary Examiner* — Edward Tso
(74) *Attorney, Agent, or Firm* — Sughrue Mion, PLLC (57) ABSTRACT

A battery system includes: an alkali secondary battery in which a negative electrode open-circuit potential remains constant within a predetermined SOC range; a temperature sensor configured to detect a temperature of the battery; a current sensor; a voltage sensor; and a controller configured to set an upper limit power value that is discharged from the alkali secondary battery, the controller being configured to: calculate a negative electrode potential of the alkali secondary battery based on the negative electrode open-circuit potential, a resistance value of a negative electrode of the alkali secondary battery, the resistance value being specified from the temperature, and the current value; calculate a positive electrode potential of the alkali secondary battery based on the negative electrode potential and the voltage value; and reduce the upper limit power value below a reference power value when the positive electrode potential is equal to or lower than a threshold.

2 Claims, 6 Drawing Sheets

BATTERY SYSTEM CONFIGURED TO SET AND REDUCE AN UPPER LIMIT POWER VALUE THAT IS DISCHARGED FROM AN ALKALI SECONDARY BATTERY

INCORPORATION BY REFERENCE

The disclosure of Japanese Patent Application No. 2014-229224, filed on Nov. 11, 2014 including the specification, drawings and abstract is incorporated herein by reference in its entirety.

BACKGROUND OF THE INVENTION

1. Field of the Invention

The invention relates to a battery system in which discharge of an alkali secondary battery is controlled on the basis of a positive electrode potential of the alkali secondary battery.

2. Description of Related Art

In International Patent Application No. 2013/105140 (W/O 2013/105140), the occurrence of a secondary reaction in a positive electrode (variation in a structure or a crystallinity of the positive electrode) is suppressed by measuring a positive electrode potential using a reference electrode, and reducing an upper limit power that can be output (discharged) from a single cell when the positive electrode potential is lower than a threshold potential. W/O 2013/105140 also describes use of a battery model method to estimate the positive electrode potential.

When a reference electrode is used, as in W/O 2013/105140, the positive electrode potential can be measured, but when the reference electrode is omitted, the positive electrode potential cannot be measured.

However, when a battery model method is used, as described in W/O 2013/105140, the positive electrode potential can be estimated without the use of a reference electrode. In an alkali secondary battery, a memory effect occurs, and the positive electrode potential of the alkali secondary battery is dependent on a state of charge (SOC) and the memory effect of the secondary battery. In other words, a voltage value and the positive electrode potential of the alkali secondary battery vary due to the memory effect even when the SOC of the alkali secondary battery remains identical.

In the battery model method described in W/O 2013/105140, the memory effect of the alkali secondary battery is not taken into account, and therefore room for improvement remains with respect to estimation of the positive electrode potential of the alkali secondary battery.

SUMMARY OF THE INVENTION

A battery system according to an aspect of the invention includes: an alkali secondary battery in which a negative electrode open-circuit potential remains constant within a predetermined SOC range; a temperature sensor configured to detect a temperature of the alkali secondary battery; a current sensor configured to detect a current value of the alkali secondary battery; a voltage sensor configured to detect a voltage value of the alkali secondary battery; and a controller configured to set an upper limit power value that can be discharged from the alkali secondary battery. The controller is configured to calculate a negative electrode potential of the alkali secondary battery on the basis of the negative electrode open-circuit potential, a resistance value of a negative electrode of the alkali secondary battery, the resistance value being specified from the temperature, and the current value, and configured to calculate a positive electrode potential of the alkali secondary battery on the basis of the negative electrode potential and the voltage value. Further, the controller is configured to reduce the upper limit power value below a reference power value when the positive electrode potential is equal to or lower than a threshold.

According to this aspect of the invention, the positive electrode potential is calculated on the basis of the negative electrode potential and the voltage value after calculating the negative electrode potential. The voltage value and the negative electrode potential are affected by a memory effect, and therefore, by calculating the positive electrode potential from the voltage value and the negative electrode potential, the positive electrode potential as affected by the memory effect can be learned.

Here, when polarization is unlikely to occur in the alkali secondary battery, variation in the negative electrode potential due to polarization is also unlikely to occur, and therefore the negative electrode potential can be calculated on the basis of the negative electrode open-circuit potential, the current value, and the resistance value of the negative electrode. The negative electrode open-circuit potential remains constant regardless of the SOC of the alkali secondary battery, and therefore the negative electrode potential can be calculated without taking the SOC of the alkali secondary battery into consideration.

By reducing the upper limit power value below the reference power value when the positive electrode potential is equal to or lower than the threshold, discharge of the alkali secondary battery can be restricted more easily, and as a result, deterioration of a positive electrode of the alkali secondary battery can be suppressed. Elution of a conductive material contained in the positive electrode may be cited as an example of deterioration of the positive electrode, and the threshold is set in consideration of deterioration of the positive electrode.

The controller may calculate a damage amount defining deterioration of the positive electrode of the alkali secondary battery on the basis of the positive electrode potential and the current value, and calculate an integrated damage amount by integrating the damage amount. Further, the controller may modify the threshold in accordance with the integrated damage amount so that the threshold decreases steadily as the integrated damage amount increases. Then, when the positive electrode potential is equal to or lower than the threshold corresponding to the integrated damage amount, the controller can reduce the upper limit power value below the reference power value. Here, the upper limit power value may be maintained at the reference power value until the positive electrode potential falls to or below the threshold corresponding to the integrated damage amount.

By reducing the upper limit power value below the reference power value when the positive electrode potential falls to or below the threshold corresponding to the integrated damage amount, discharge of the alkali secondary battery can be restricted more easily, and as a result, deterioration of the positive electrode of the alkali secondary battery can be suppressed. Further, when the integrated damage amount increases, deterioration of the positive electrode advances, and as a result, an output of the alkali secondary battery may become insufficient. Hence, by maintaining the upper limit power value at the reference power value until the positive electrode potential falls to or below the threshold corresponding to the integrated damage amount, the output of the alkali secondary battery can be secured more easily.

The threshold may include a first threshold set in advance and a second threshold corresponding to the integrated damage amount. Here, between connecting the alkali secondary battery to a load and disconnecting the alkali secondary battery from the load, the controller may set the upper limit power value at the reference power value until the positive electrode potential falls to or below the second threshold, and reduce the upper limit power value below the reference power value when the positive electrode potential falls to or below the second threshold. After the upper limit power value is thus reduced below the reference power value, the controller may reduce the upper limit power value below the reference power value when the positive electrode potential falls to or below the first threshold.

By setting the upper limit power value at the reference power value until the positive electrode potential falls to or below the second threshold, the output of the alkali secondary battery can be secured more easily, as described above. Further, by reducing the upper limit power value below the reference power value when the positive electrode potential falls to or below the second threshold, deterioration of the positive electrode of the alkali secondary battery can be suppressed, as described above. Furthermore, by reducing the upper limit power value below the reference power value when the positive electrode potential falls to or below the first threshold after reducing the upper limit power value below the reference power value, suppressing deterioration of the positive electrode of the alkali secondary battery can be prioritized.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described below.

First Embodiment

Figure 1:
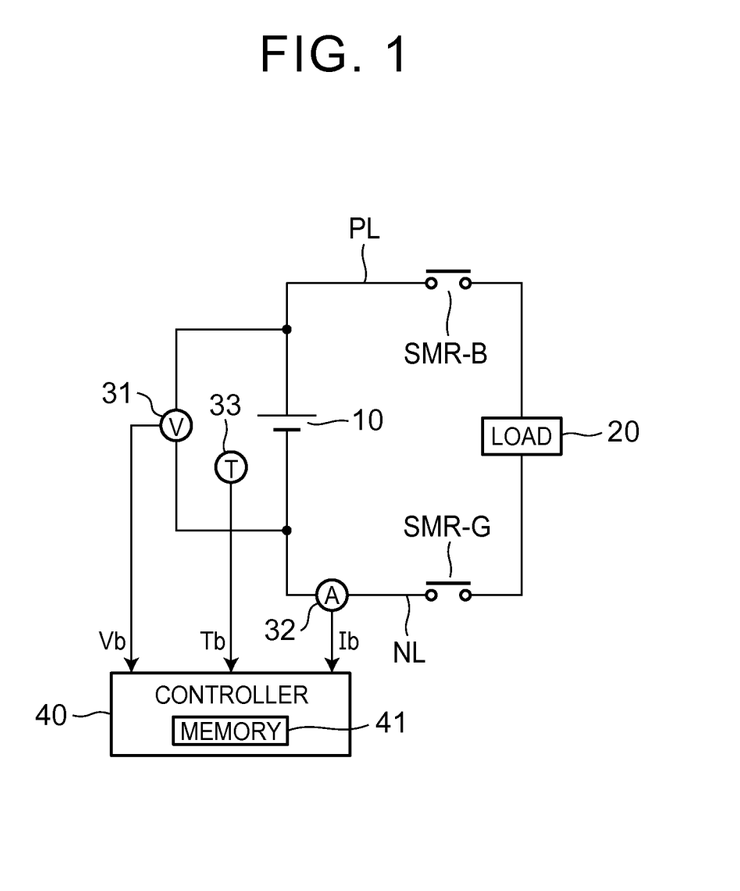
FIG. 1 is a view showing a configuration of a battery system.

A battery system according to a first embodiment will be described using FIG. 1. A secondary battery 10 is connected to a load 20 via a positive electrode line PL and a negative electrode line NL. An alkali secondary battery such as a nickel hydrogen battery is used as the secondary battery 10. A memory effect occurs in an alkali secondary battery.

The secondary battery 10 includes a positive electrode plate, a negative electrode plate, and a separator disposed between the positive electrode plate and the negative electrode plate. The positive electrode plate includes a collector plate and a positive electrode active material layer formed on a surface of the collector plate, and the positive electrode active material layer includes a positive electrode active material and a conductive material. The negative electrode plate includes a collector plate and a negative electrode active material layer formed on a surface of the collector plate, and the negative electrode active material layer includes a negative electrode active material and a conductive material. The positive electrode active material layer, the negative electrode active material layer, and the separator are impregnated with an electrolyte.

A system main relay SMR-B is provided on the positive electrode line PL, and a system main relay SMR-G is provided on the negative electrode line NL. The system main relays SMR-B, SMR-G are switched ON and OFF by control signals received from a controller 40.

The load 20 operates upon reception of power discharged from the secondary battery 10, and supplies power (charging power) to the secondary battery 10. When the battery system according to this embodiment is installed in a vehicle, a motor/generator can be used as the load 20. The motor/generator generates kinetic energy for causing the vehicle to travel upon reception of the power discharged from the secondary battery 10. Further, the motor/generator is capable of converting kinetic energy generated when the vehicle brakes into power, and outputting this power (regenerated power) to the secondary battery 10.

Note that when the secondary battery 10 is installed in a vehicle, a battery pack formed by connecting a plurality of secondary batteries 10 in series may be installed in the vehicle. Here, the battery pack may include a plurality of secondary batteries 10 connected in parallel. The battery pack may be formed from a plurality of battery blocks connected in series. Here, each battery block is constituted by a plurality of secondary batteries (single cells) 10 connected in series.

A voltage sensor 31 detects a voltage value Vb of the secondary battery 10, and outputs a detection result to the controller 40. When the battery pack described above is used, the voltage sensor 31 may detect the voltage value of the aforementioned battery block. In this case, the voltage value of the secondary battery 10 can be calculated by dividing the voltage value of the battery block by the number of secondary batteries 10 constituting the battery block.

A current sensor 32 detects a current value Ib of the secondary battery 10, and outputs a detection result to the controller 40. In this embodiment, the current value Ib during discharge of the secondary battery 10 is set to take a positive value, and the current value Ib during charging of the secondary battery 10 is set to take a negative value. A temperature sensor 33 detects a temperature (to be referred to as a battery temperature) Tb of the secondary battery 10, and outputs a detection result to the controller 40. The controller 40 includes a memory 41 that stores predetermined information.

Figure 2:
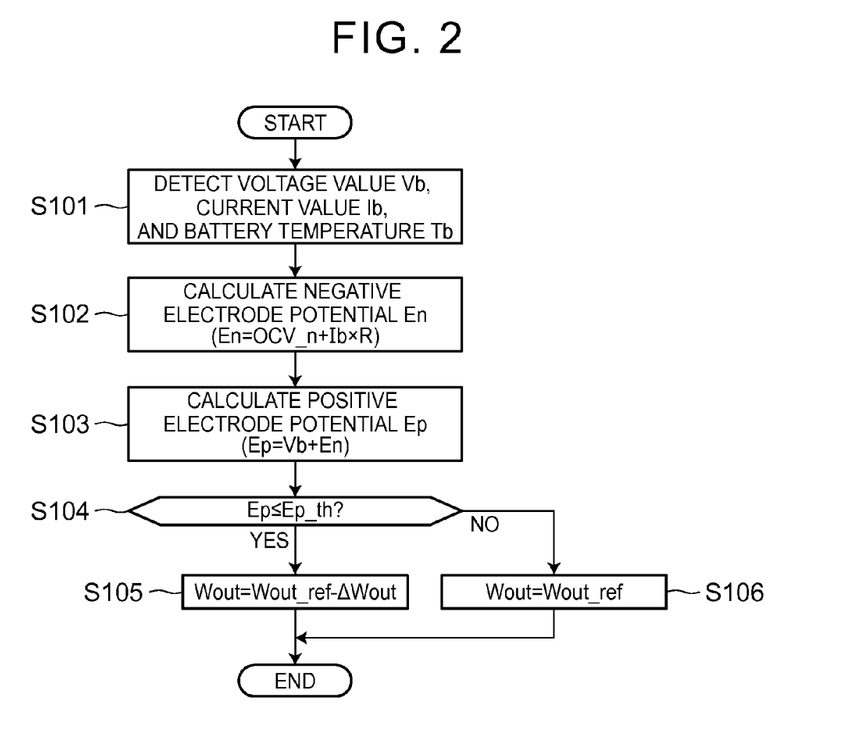
FIG. 2 is a flowchart showing processing for setting a discharge power allowable value, according to a first embodiment.

Next, processing for setting a discharge power allowable value Wout in the battery system according to this embodiment will be described using a flowchart shown in FIG. 2. The processing shown in FIG. 2 is executed at predetermined period intervals when the system main relays SMR-B, SMR-G are ON.

The discharge power allowable value Wout is an upper limit power value that can be discharged from the secondary battery 10. When the secondary battery 10 is discharged, the controller 40 controls discharge of the secondary battery 10 so that a discharge power value of the secondary battery 10 does not exceed the discharge power allowable value Wout. As a result, the discharge power value of the secondary battery 10 varies within a range no higher than the discharge power allowable value Wout.

In step S101, the controller 40 detects the voltage value Vb, the current value Ib, and the battery temperature Tb using the voltage sensor 31, the current sensor 32, and the temperature sensor 33. In step S102, the controller 40 calculates a negative electrode potential En of the secondary battery 10. More specifically, the controller 40 calculates the negative electrode potential En on the basis of Equation (1), shown below.

$$En = OCV\_n + Ib \times R \quad (1)$$

In Equation (1), OCV_n denotes an open-circuit potential of the negative electrode, and R denotes a resistance value of the negative electrode. The open-circuit potential OCV_n remains constant within a predetermined SOC range of the secondary battery 10, or in other words remains constant regardless of the SOC of the secondary battery 10. The predetermined SOC range is a possible range of the SOC of the secondary battery 10 when charging/discharging of the secondary battery 10 is controlled. The open-circuit potential OCV_n may therefore be determined in advance.

The resistance value R is dependent on the battery temperature Tb, and therefore a correspondence relationship between the resistance value R and the battery temperature Tb can be determined in advance (in the form of a map or a calculation formula). By detecting the battery temperature Tb using this correspondence relationship, the resistance value R corresponding to the detected battery temperature Tb can be specified.

Correspondence relationships of the open-circuit potential OCV_n with the resistance value R and the battery temperature Tb may be stored in the memory 41 in advance. By inserting the open-circuit potential OCV_n determined in advance, the resistance value R corresponding to the battery temperature Tb detected in the processing of step S101, and the current value Ib detected in the processing of step S101 into Equation (1), the negative electrode potential En can be calculated.

Figure 3:
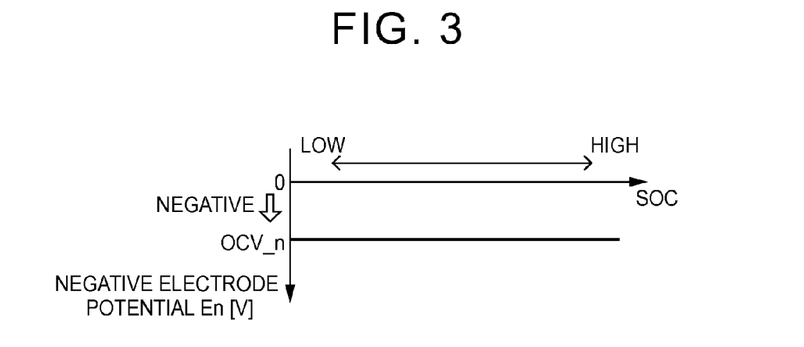
FIG. 3 is a view showing a relationship between an SOC and a negative electrode open-circuit potential of a secondary battery.

As shown in FIG. 3, the open-circuit potential OCV_n of the negative electrode remains fixed at a value lower than 0 [V] regardless of the SOC of the secondary battery 10. In FIG. 3, the abscissa shows the SOC of the secondary battery 10, and the ordinate shows the negative electrode potential En.

Figure 4:
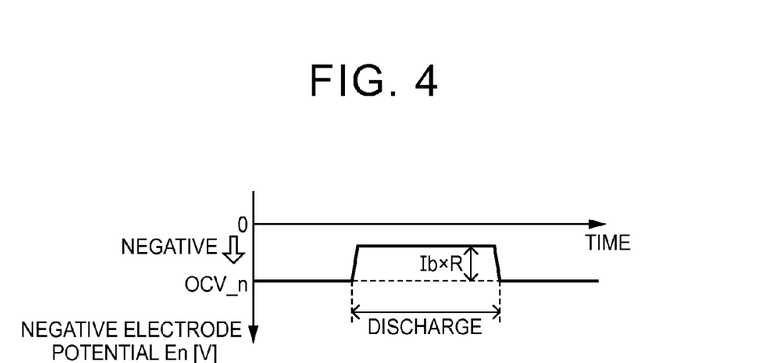
FIG. 4 is a view showing variation in a negative electrode potential when the secondary battery is discharged.

As shown in FIG. 4, when the secondary battery 10 is discharged, the negative electrode potential En becomes higher than the open-circuit potential OCV_n. In FIG. 4, the abscissa shows time and the ordinate shows the negative electrode potential En. Here, a difference between the negative electrode potential En and the open-circuit potential OCV_n during discharge corresponds to an amount of variation in the negative electrode potential En while the secondary battery 10 is energized, and takes a value obtained by multiplying the current value Ib by the resistance value R. Therefore, as shown in Equation (1), the negative electrode potential En can be calculated on the basis of the open-circuit potential OCV_n, the current value Ib, and the resistance value R.

As the battery temperature Tb increases, the negative electrode potential En becomes steadily more likely to exhibit the behavior shown in FIG. 4. More specifically, when the battery temperature Tb equals or exceeds a predetermined temperature Tb_th during discharge of the secondary battery 10, polarization does not occur, and therefore, as shown in FIG. 4, the negative electrode potential En exhibits a constant potential regardless of the discharge time.

Figure 5:
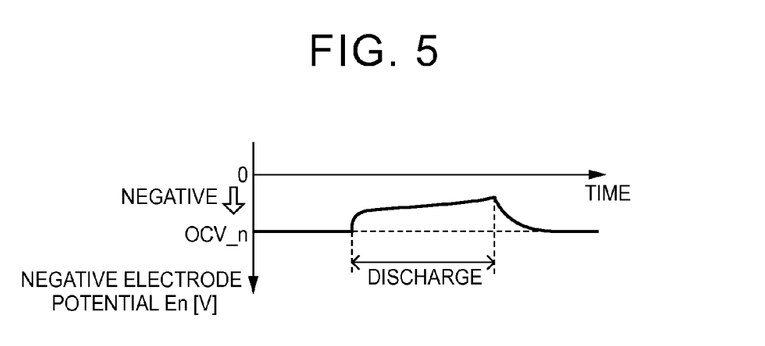
FIG. 5 is a view showing variation in the negative electrode potential when the secondary battery is discharged.

When the battery temperature Tb is lower than the predetermined temperature Tb_th, on the other hand, polarization is more likely to occur, and therefore, as shown in FIG. 5, the negative electrode potential En is more likely to vary in accordance with the discharge time. In FIG. 5, the abscissa shows time and the ordinate shows the negative electrode potential En. As shown in FIG. 5, when the negative electrode potential En varies, it becomes more difficult to specify the negative electrode potential En.

When the secondary battery 10 is connected to the load 20 and subjected to charging/discharging, the battery temperature Tb typically reaches or exceeds the predetermined temperature Tb_th easily due to heat generated in the secondary battery 10 while the secondary battery 10 is energized. Polarization is therefore unlikely to occur while the secondary battery 10 is charged and discharged, and as a result, the negative electrode potential En is more likely to exhibit a constant potential regardless of the discharge time. Hence, the negative electrode potential En can be calculated on the basis of Equation (1).

In step S103, the controller 40 calculates a positive electrode potential Ep of the secondary battery 10. More specifically, the controller 40 calculates the positive electrode potential Ep on the basis of Equation (2), shown below. The voltage value Vb corresponds to a difference between the positive electrode potential Ep and the negative electrode potential En, from which Equation (2) can be derived.

$$Ep = Vb + En \quad (2)$$

In Equation (2), the voltage value Vb detected in the processing of step S101 is used as the voltage value Vb, and the negative electrode potential En calculated in the processing of step S102 is used as the negative electrode potential En.

In step S104, the controller 40 determines whether or not the positive electrode potential Ep calculated in the processing of step S103 is equal to or lower than a threshold (a positive electrode potential) Ep_th. The threshold Ep_th is a fixed value set in advance in consideration of a potential at which the positive electrode plate of the secondary battery 10 deteriorates, and is set at a larger potential than 0 [V]. Elution of the conductive material in the positive electrode active material layer into the electrolyte may be cited as an example of deterioration of the positive electrode plate.

Figure 6:
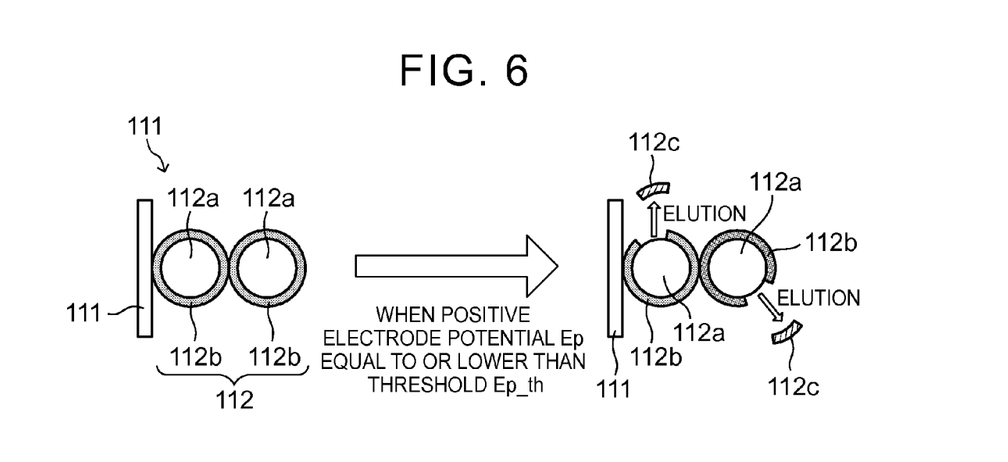
FIG. 6 is a view illustrating elution of a conductive material in a positive electrode active material layer.

As shown in FIG. 6, a positive electrode active material layer 112 constituted by a positive electrode active material 112a and a conductive material 112b is formed on a surface of a collector plate 111 of a positive electrode plate 11, and a surface of the positive electrode active material 112a is covered by the conductive material 112b. When the positive electrode potential Ep falls to or below the threshold Ep_th, the conductive material 112b is eluted into the electrolyte, thereby forming eluate 112c. Once the eluate 112c is formed, the eluate 112c cannot return to the conductive material 112b. As the amount of eluate 112c increases, therefore, the amount of conductive material 112b decreases, leading to a reduction in conductivity in the positive electrode plate 11. When the conductivity of the positive electrode plate 11 decreases, an output performance of the secondary battery 10 deteriorates.

When the positive electrode potential Ep is equal to or lower than the threshold Ep_th in the processing of step S104 shown in FIG. 2, the controller 40 sets the discharge power allowable value Wout at a smaller value than a reference power value Wout_ref in step S105. The reference power value Wout_ref will be described below. Here, a difference between the set discharge power allowable value Wout and the reference power value Wout_ref is expressed as ΔWout.

The difference ΔWout may be a fixed value determined in advance, or may be modified in accordance with the difference between the positive electrode potential Ep and the threshold Ep_th. When the difference ΔWout is modified in accordance with the difference between the positive electrode potential Ep and the threshold Ep_th, the difference ΔWout can be increased as the difference between the positive electrode potential Ep and the threshold Ep_th increases. In other words, the difference ΔWout can be reduced as the difference between the positive electrode potential Ep and the threshold Ep_th decreases.

Here, the difference ΔWout may be modified either continuously or in steps in accordance with the difference between the positive electrode potential Ep and the threshold Ep_th. Modifying the difference ΔWout in steps includes not modifying the difference ΔWout even when the difference between the positive electrode potential Ep and the threshold Ep_th varies. When the difference ΔWout is modified continuously, the difference ΔWout is always modified in response to variation in the difference between the positive electrode potential Ep and the threshold Ep_th.

When the positive electrode potential Ep is higher than the threshold Ep_th in the processing of step S104 shown in FIG. 2, the controller 40 sets the discharge power allowable value Wout at the reference power value Wout_ref in step S106.

The reference power value Wout_ref is set on the basis of at least one of the battery temperature Tb and the SOC of the secondary battery 10. This will now be described more specifically.

Figure 7:
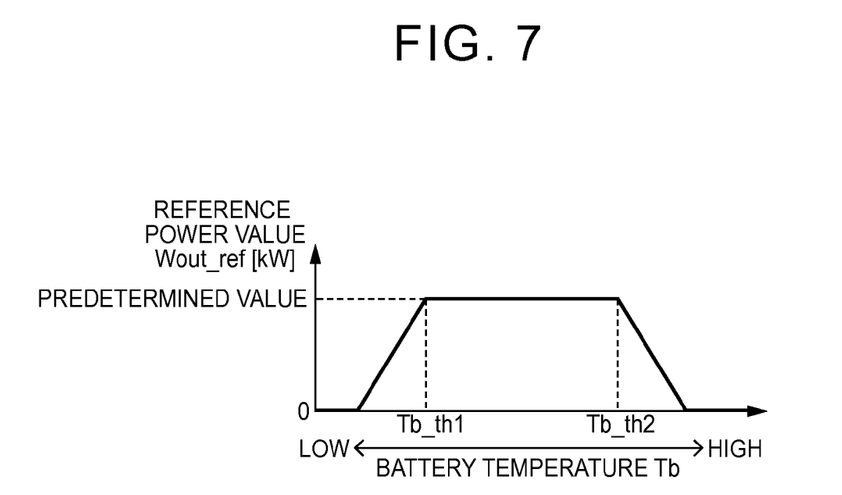
FIG. 7 is a view showing a correspondence relationship between a reference power value and a battery temperature during discharge.

FIG. 7 shows a correspondence relationship between the reference power value Wout_ref and the battery temperature Tb. As shown in FIG. 7, by determining the correspondence relationship between the reference power value Wout_ref and the battery temperature Tb in advance (in the form of a map or a calculation formula) and then detecting the battery temperature Tb, the reference power value Wout_ref corresponding to the detected battery temperature Tb can be set. The correspondence relationship between the reference power value Wout_ref and the battery temperature Tb may be stored in the memory 41 in advance.

In FIG. 7, when the battery temperature Tb is equal to or higher than a first predetermined temperature Tb_th1 and equal to or lower than a second predetermined temperature Tb_th2, the reference power value Wout_ref takes a predetermined value (a fixed value). In other words, when the battery temperature Tb is equal to or higher than the first predetermined temperature Tb_th1 and equal to or lower than the second predetermined temperature Tb_th2, the reference power value Wout_ref takes the predetermined value regardless of the battery temperature Tb. Note that the second predetermined temperature Tb_th2 is higher than the first predetermined temperature Tb_th1.

When the battery temperature Tb is lower than the first predetermined temperature Tb_th1, on the other hand, the reference power value Wout_ref decreases as the battery temperature Tb decreases. Further, when the battery temperature Tb is higher than the second predetermined temperature Tb_th2, the reference power value Wout_ref decreases as the battery temperature Tb increases. Depending on the battery temperature Tb, the reference power value Wout_ref may be set at 0 [kW], and at this time the secondary battery 10 is not discharged.

Figure 8:
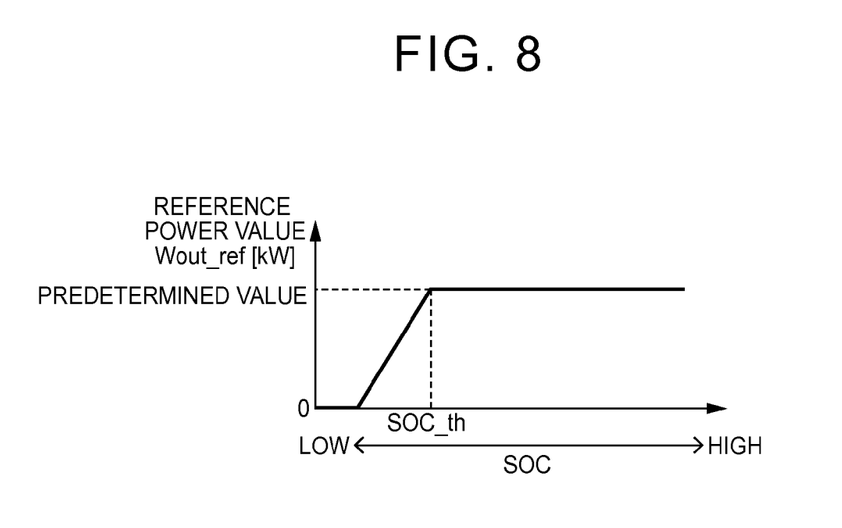
FIG. 8 is a view showing a correspondence relationship between the reference power value and the SOC during discharge.

FIG. 8 shows a correspondence relationship between the reference power value Wout_ref and the SOC of the secondary battery 10. As shown in FIG. 8, by determining the correspondence relationship between the reference power value Wout_ref and the SOC of the secondary battery 10 in advance (in the form of a map or a calculation formula) and then calculating the SOC of the secondary battery 10, the reference power value Wout_ref corresponding to the calculated SOC can be set. The correspondence relationship between the reference power value Wout_ref and the SOC of the secondary battery 10 may be stored in the memory 41 in advance. The SOC of the secondary battery 10 can be calculated on the basis of the current value Ib and the voltage value Vb as in the conventional method.

In FIG. 8, when the SOC of the secondary battery 10 is equal to or higher than a threshold SOC_th, the reference power value Wout_ref takes a predetermined value regardless of the SOC. When the SOC of the secondary battery 10 is lower than the threshold SOC_th, on the other hand, the reference power value Wout_ref decreases as the SOC decreases. Here, depending on the SOC of the secondary battery 10, the reference power value Wout_ref may be set at 0 [kW], and at this time the secondary battery 10 is not discharged.

To set the reference power value Wout_ref on the basis of the battery temperature Tb and the SOC of the secondary battery 10, the correspondence relationships of the reference power value Wout_ref with the battery temperature Tb and the SOC are preferably determined in advance (in the form of maps or calculation formulae). Thus, by detecting the battery temperature Tb and calculating the SOC of the secondary battery 10, the reference power value Wout_ref corresponding to the detected battery temperature Tb and the calculated SOC can be set.

Actions and effects of this embodiment will now be described.

According to this embodiment, by reducing the discharge power allowable value Wout below the reference power value Wout_ref when the positive electrode potential Ep is equal to or lower than the threshold Ep_th, discharge of the secondary battery 10 can be restricted more easily, and as a result, charging of the secondary battery 10 is prioritized. By charging the secondary battery 10, the positive electrode potential Ep can be increased, and as a result, the positive electrode potential Ep can be varied to a higher potential than the threshold Ep_th.

As described using FIG. 6, when the positive electrode potential Ep remains at or below the threshold Ep_th, the conductive material 112b of the positive electrode active material layer 112 is continuously eluted into the electrolyte, but by increasing the positive electrode potential Ep to a higher potential than the threshold Ep_th, elution of the conductive material 112b can be suppressed. As a result, a reduction in the output performance of the secondary battery 10 due to elution of the conductive material 112b can be suppressed.

When the discharge power allowable value Wout is set on the basis of the positive electrode potential Ep, as in this embodiment, the positive electrode potential Ep may be calculated directly. However, the positive electrode potential Ep varies in accordance with the SOC and the memory effect of the secondary battery 10. Moreover, even when the SOC of the secondary battery 10 remains constant, the positive electrode potential Ep varies in accordance with a generation condition of the memory effect. Since it is difficult to grasp the generation condition of the memory effect, it is also difficult to calculate the positive electrode potential Ep directly.

In this embodiment, the negative electrode potential En is calculated before calculating the positive electrode potential Ep. This embodiment focuses on the fact that the open-circuit potential OCV_n of the negative electrode remains constant regardless of the SOC of the secondary battery 10. This embodiment also focuses on the fact that during discharge of the secondary battery 10, the negative electrode potential En does not vary regardless of the discharge time, and therefore the negative electrode potential En is not affected by polarization. In consideration of these facts, the negative electrode potential En can be calculated on the basis of Equation (1).

After calculating the negative electrode potential En, the positive electrode potential Ep can be calculated on the basis of the voltage value Vb and the negative electrode potential En, as shown in Equation (2). Here, the voltage value Vb and the positive electrode potential Ep are affected by the memory effect, and therefore, by calculating the positive electrode potential Ep from the voltage value Vb and the negative electrode potential En, the positive electrode potential Ep as affected by the memory effect can be learned.

A battery system according to a second embodiment of the invention will now be described. In this embodiment, identical constituent elements to constituent elements described in the first embodiment have been allocated identical reference symbols, and detailed description thereof has been omitted.

In the first embodiment, the discharge power allowable value Wout is reduced below the reference power value Wout_ref when the positive electrode potential Ep is equal to or lower than the (fixed value) threshold Ep_th. In this embodiment, the threshold Ep_th (to be referred to as a threshold Ep_th_ini) used when the processing for reducing the discharge power allowable value Wout below the reference power value Wout_ref is performed for the first time between connecting the secondary battery 10 to the load 20 and disconnecting the secondary battery 10 from the load 20 is modified. Here, the threshold Ep_th corresponds to a first threshold according to the invention, while the threshold Ep_th_ini corresponds to a second threshold according to the invention.

In this embodiment, a deterioration condition of the positive electrode plate 11 (for example, an elution condition of the conductive material 112b) is defined as a damage amount D, and the threshold Ep_th_ini is modified on the basis of an integrated value of the damage amount D (to be referred to as an integrated damage amount ΣD). The integrated damage amount ΣD is an integrated value of the damage amount D from the first time the secondary battery 10 is subjected to charging/discharging to the present.

When the integrated damage amount ΣD is zero, the threshold Ep_th_ini is equal to the (fixed value) threshold Ep_th. When the integrated damage amount ΣD is larger than zero, the threshold Ep_th_ini is lower than the (fixed value) threshold Ep_th. Here, a difference between the threshold Ep_th_ini and the (fixed value) threshold Ep_th widens as the integrated damage amount ΣD increases.

Figure 9:
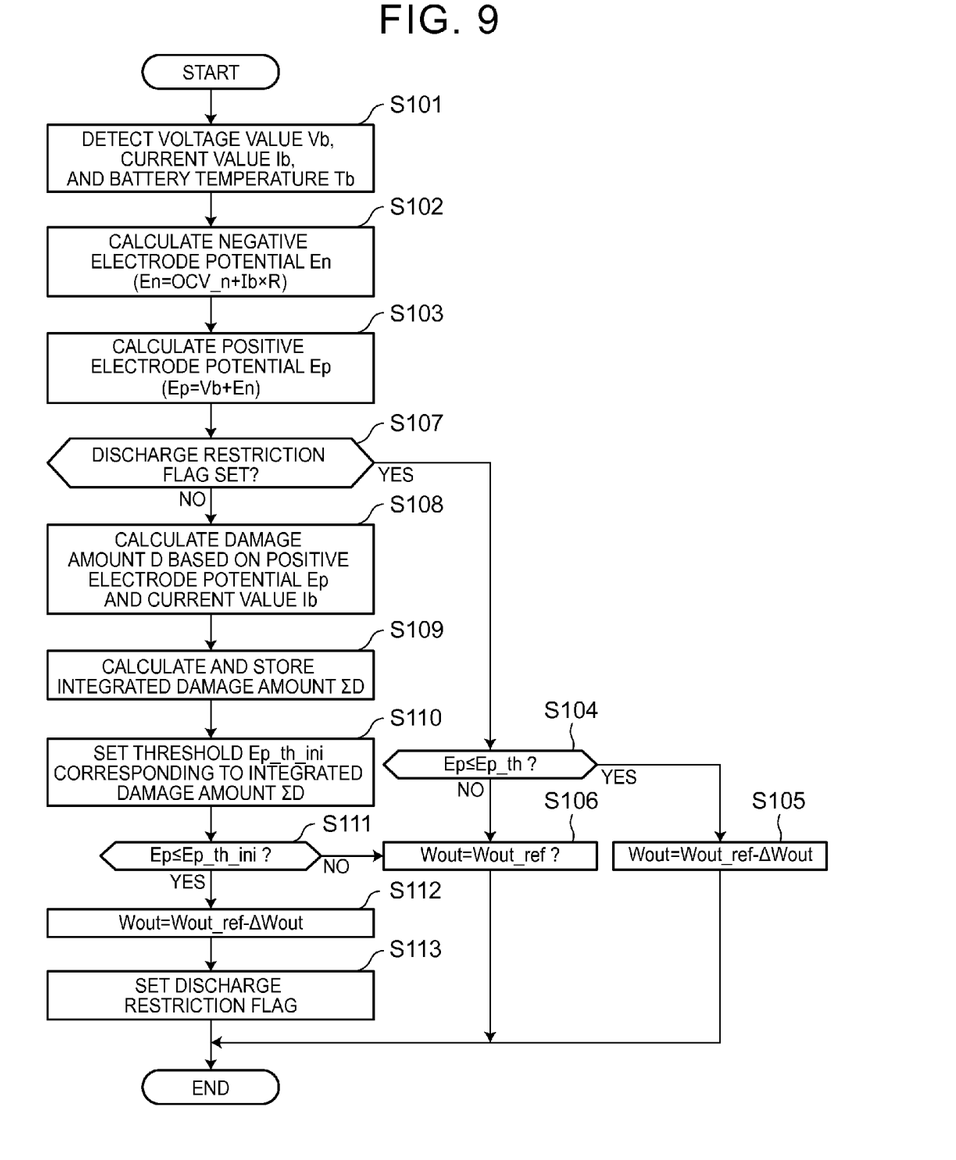
FIG. 9 is a flowchart showing processing for setting the discharge power allowable value, according to a second embodiment.

Processing for setting the discharge power allowable value Wout according to this embodiment will be described using a flowchart shown in FIG. 9. The processing shown in FIG. 9 is executed at predetermined period intervals when the system main relays SMR-B, SMR-G are ON. In FIG. 9, identical processes to the processes described using FIG. 2 have been allocated identical step numbers, and detailed description thereof has been omitted.

After calculating the positive electrode potential Ep in the processing of step S103, the controller 40 determines whether or not a discharge restriction flag is set in step S107. The setting condition of the discharge restriction flag is stored in the memory 41.

Here, the controller 40 cancels setting of the discharge restriction flag every time the secondary battery 10 and the load 20 are disconnected, or in other words every time the system main relays SMR-B, SMR-G are switched OFF. The discharge restriction flag is therefore not set when the secondary battery 10 is connected to the load 20, or in other words when the system main relays SMR-B, SMR-G are switched ON. Furthermore, as will be described below, the not set until the secondary battery 10 is connected to the load 20 and the discharge power allowable value Wout is reduced below the reference power value Wout_ref.

Figure 10:
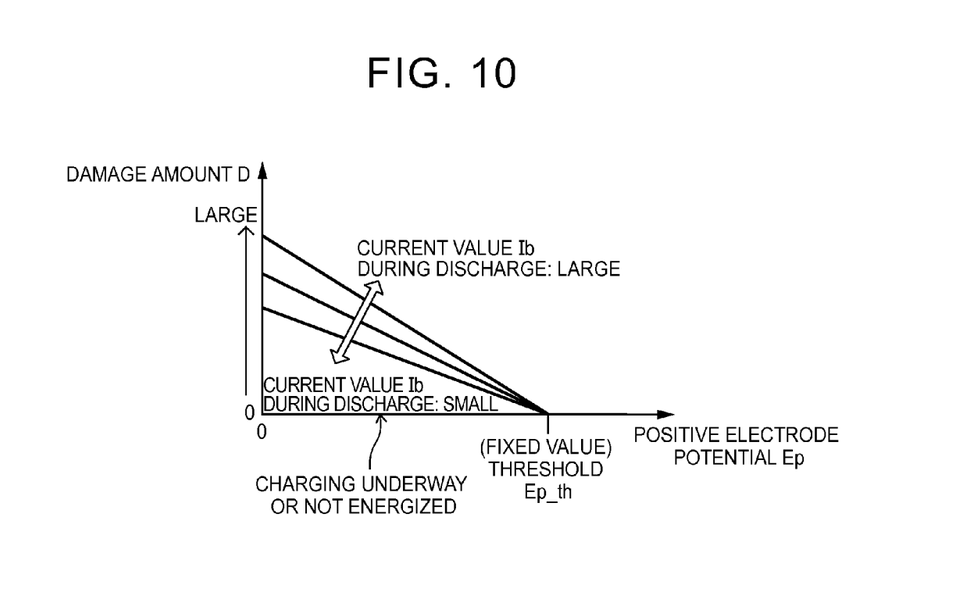
FIG. 10 is a view showing a correspondence relationship between a positive electrode potential and a damage amount.

When the discharge restriction flag is not set in the processing of step S107, the controller 40 calculates the damage amount D in step S108 on the basis of the positive electrode potential Ep calculated in the processing of step S103 and the current value Ib detected in the processing of step S101. More specifically, the damage amount D is calculated as shown in FIG. 10. In FIG. 10, the abscissa shows the positive electrode potential Ep and the ordinate shows the damage amount D.

When the positive electrode potential Ep is higher than the (fixed value) threshold Ep_th, the damage amount D is zero. The damage amount D is also zero when charging is underway in the secondary battery 10 and when charging/discharging is not underway in the secondary battery 10.

When the positive electrode potential Ep is equal to or lower than the (fixed value) threshold Ep_th while discharging is underway in the secondary battery 10, on the other hand, the damage amount D increases from zero. Here, the damage amount D increases as the positive electrode potential Ep decreases below the (fixed value) threshold Ep_th, and decreases as the positive electrode potential Ep approaches the (fixed value) threshold Ep_th. Further, the damage amount D increases as the current value Ib during discharge of the secondary battery 10 increases, and decreases as the current value Ib during discharge of the secondary battery 10 decreases.

In step S109, the controller 40 calculates the current integrated damage amount ΣD on the basis of the damage amount D calculated in the processing of step S108. More specifically, the controller 40 calculates the current integrated damage amount ΣD by adding the damage amount D calculated most recently in the processing of step S108 to the previously calculated integrated damage amount ΣD. Further, the controller 40 stores the current integrated damage amount ΣD in the memory 41. The integrated damage amount ΣD stored in the memory 41 is used to calculate the next integrated damage amount ΣD.

Figure 11:
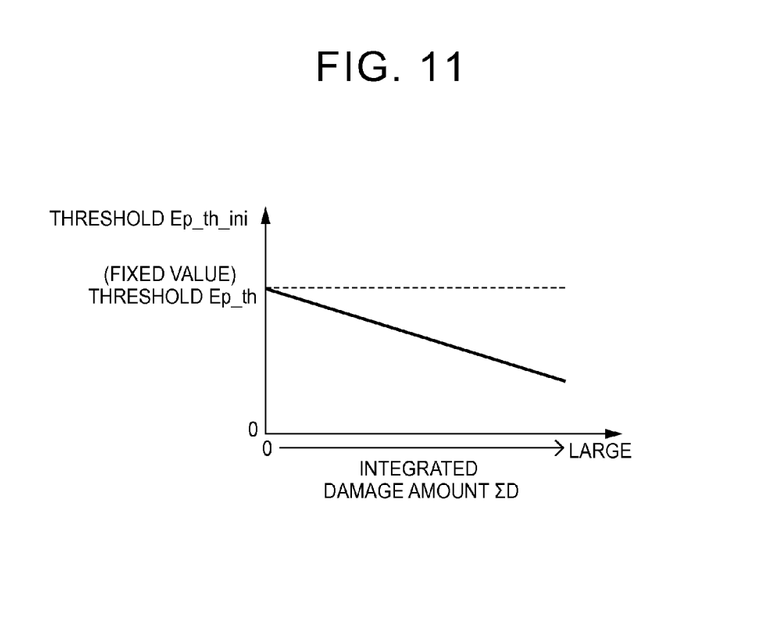
FIG. 11 is a view showing a correspondence relationship between an integrated damage amount and a threshold.

In step S110, the controller 40 sets the threshold Ep_th_ini corresponding to the integrated damage amount ΣD calculated in the processing of step S109. More specifically, as shown in FIG. 11, the threshold Ep_th_ini corresponding to the integrated damage amount ΣD can be set by determining a correspondence relationship between the integrated damage amount ΣD and the threshold Ep_th_ini in advance (in the form of a map or a calculation formula). As shown in FIG. 11, the threshold Ep_th_ini is set to be steadily lower than the (fixed value) threshold Ep_th as the integrated damage amount ΣD increases. In other words, the threshold Ep_th_ini steadily approaches the (fixed value) threshold Ep_th as the integrated damage amount ΣD approaches zero. When the integrated damage amount ΣD is zero, the threshold Ep_th_ini is equal to the (fixed value) threshold Ep_th.

In step S111, the controller 40 determines whether or not the positive electrode potential Ep calculated in the processing of step S103 is equal to or lower than the threshold Ep_th_ini set in the processing of step S110. When the positive electrode potential Ep is higher than the threshold Ep_th_ini, the controller 40 performs the processing of step S106.

When the positive electrode potential Ep is equal to or lower than the threshold Ep_th_ini in the processing of step S111, on the other hand, the controller 40 reduces the discharge power allowable value Wout below the reference power value Wout_ref in step S112. The processing of step S112 is identical to the processing of step S105, described using FIG. 2.

In the processing of step S112, the difference ΔWout may be a fixed value determined in advance, or may be modified in accordance with the difference between the positive electrode potential Ep and the threshold Ep_th_ini. When the difference ΔWout is modified in accordance with the difference between the positive electrode potential Ep and the threshold Ep_th_ini, the difference ΔWout can be increased as the difference between the positive electrode potential Ep and the threshold Ep_th_ini increases. In other words, the difference ΔWout can be reduced as the difference between the positive electrode potential Ep and the threshold Ep_th_ini decreases.

Following the processing of step S112, the controller 40 sets the discharge restriction flag in step S113. The setting of the discharge restriction flag is stored in the memory 41.

When the discharge restriction flag is set in the processing of step S107, the controller 40 performs the processing of step S104. The processing of steps S104, S105, and S106 is as described in the first embodiment.

According to this embodiment, before the discharge restriction flag is set, the threshold Ep_th_ini is set in accordance with the integrated damage amount ΣD, and when the positive electrode potential Ep is equal to or lower than the threshold Ep_th_ini, the discharge power allowable value Wout is reduced below the reference power value Wout_ref. Once the discharge power allowable value Wout has been reduced below the reference power value Wout_ref, the discharge restriction flag is set.

After the discharge restriction flag is set, a determination is made as to whether or not the positive electrode potential Ep is equal to or lower than the (fixed value) threshold Ep_th. When the positive electrode potential Ep is equal to or lower than the (fixed value) threshold Ep_th, the discharge power allowable value Wout is reduced below the reference power value Wout_ref.

As the integrated damage amount ΣD increases, deterioration of the positive electrode plate 11 (elution of the conductive material 112b, for example) advances, leading to a reduction in the output performance of the secondary battery 10, as described in the first embodiment. Here, by reducing the discharge power allowable value Wout below the reference power value Wout_ref when the positive electrode potential Ep is equal to or lower than the (fixed value) threshold Ep_th, the output of the secondary battery 10 may become insufficient. In particular, when the battery system according to this embodiment is installed in a vehicle such that the vehicle uses the output of the secondary battery 10, a travel performance of the vehicle may deteriorate.

Hence, in this embodiment, the discharge power allowable value Wout is held at the reference power value Wout_ref until the positive electrode potential Ep falls to or below the threshold Ep_th_ini in order to secure the output of the secondary battery 10.

By reducing the discharge power allowable value Wout below the reference power value Wout_ref when the positive electrode potential Ep is equal to or lower than the threshold Ep_th_ini, on the other hand, charging of the secondary battery 10 can be prioritized so that the positive electrode potential Ep can be increased, and as a result, deterioration of the positive electrode plate 11 (elution of the conductive material 112b, for example) can be suppressed. Furthermore, after the discharge restriction flag is set, the positive electrode potential Ep can be increased by reducing the discharge power allowable value Wout below the reference power value Wout_ref when the positive electrode potential Ep falls to or below the (fixed value) threshold Ep_th, and as a result, deterioration of the positive electrode plate 11 can be suppressed. In other words, after the discharge restriction flag is set, suppressing deterioration of the positive electrode plate 11 is prioritized.

What is claimed is:
1. A battery system comprising:
an alkali secondary battery in which a negative electrode open-circuit potential remains constant within a predetermined SOC range;
a temperature sensor configured to detect a temperature of the alkali secondary battery;
a current sensor configured to detect a current value of the alkali secondary battery;
a voltage sensor configured to detect a voltage value of the alkali secondary battery; and
a controller configured to set an upper limit power value that is discharged from the alkali secondary battery, the controller being configured to calculate a negative electrode potential of the alkali secondary battery based on the negative electrode open-circuit potential, a resistance value of a negative electrode of the alkali secondary battery, the resistance value being specified from the temperature, and the current value, the controller being configured to calculate a positive electrode potential of the alkali secondary battery based on the negative electrode potential and the voltage value, and the controller being configured to reduce the upper limit power value below a reference power value when the positive electrode potential is equal to or lower than a threshold,
wherein
the controller is configured to calculate a damage amount defining deterioration of a positive electrode of the alkali secondary battery based on the positive electrode potential and the current value, and calculate an integrated damage amount by integrating the damage amount, the controller is configured to modify the threshold in accordance with the integrated damage amount such that the threshold decreases steadily as the integrated damage amount increases, and the controller is configured to reduce the upper limit power value below the reference power value when the positive electrode potential is equal to or lower than the threshold corresponding to the integrated damage amount.

2. The battery system according to claim 1, wherein the threshold includes a first threshold set in advance and a second threshold corresponding to the integrated damage amount, the controller is configured to set the upper limit power value at the reference power value until the positive electrode potential falls to or below the second threshold between connecting the alkali secondary battery to a load and disconnecting the alkali secondary battery from the load, the controller is configured to reduce the upper limit power value below the reference power value when the positive electrode potential falls to or below the second threshold before the alkali secondary battery is disconnected from the load, and the controller is configured to reduce the upper limit power value below the reference power value when the positive electrode potential falls to or below the first threshold after the upper limit power value is reduced below the reference power value.

* * * * *